United States Patent [19]

Clausen

[11] Patent Number: 4,811,149
[45] Date of Patent: Mar. 7, 1989

[54] METHOD AND APPARATUS FOR CLEANING OPERATING COMPONENTS OF A VIDEO PLAYER/RECORDER

[76] Inventor: Eivind Clausen, 2518 Erie St., Bellingham, Wash. 98226

[21] Appl. No.: 88,051

[22] Filed: Aug. 21, 1989

Related U.S. Application Data

[63] Continuation of Ser. No. 833,875, Feb. 25, 1986, abandoned.

[51] Int. Cl.$^4$ .............................................. G11B 5/41
[52] U.S. Cl. ...................................... 360/128; 360/95
[58] Field of Search ....................... 360/128, 84, 85, 95

[56] References Cited

U.S. PATENT DOCUMENTS

| | | | |
|---|---|---|---|
| 4,387,411 | 6/1983 | Clausen et al. | 360/128 |
| 4,462,056 | 7/1984 | Kara | 360/128 |
| 4,498,113 | 2/1985 | Clausen et al. | 360/128 |
| 4,580,185 | 4/1986 | Clausen et al. | 360/128 |
| 4,616,283 | 10/1986 | Clausen et al. | 360/128 |
| 4,761,700 | 8/1988 | Fritsch | 360/128 |

*Primary Examiner*—John H. Wolff
*Assistant Examiner*—Matthew J. Bussan
*Attorney, Agent, or Firm*—Hughes, Cassidy & Multer

[57] ABSTRACT

A cassette cleaner adapted to be positioned in a cassette receiving recess of a video player/recorder. A cleaning ribbon is mounted in the cassette cleaner, and guide members of the video player/recorder carry the cleaning ribbon outwardly into cleaning engagement with the rotating head of the player/recorder. The cassette cleaner has a stationary locating element which restrains outward movement of a portion of the ribbon so that the ribbon engages the peripheral surface of the rotating drum that carries the head member along two contact locations of relatively short arcuate length. This reduces the frictional engagement of the ribbon relative to the rotating drum.

4 Claims, 3 Drawing Sheets

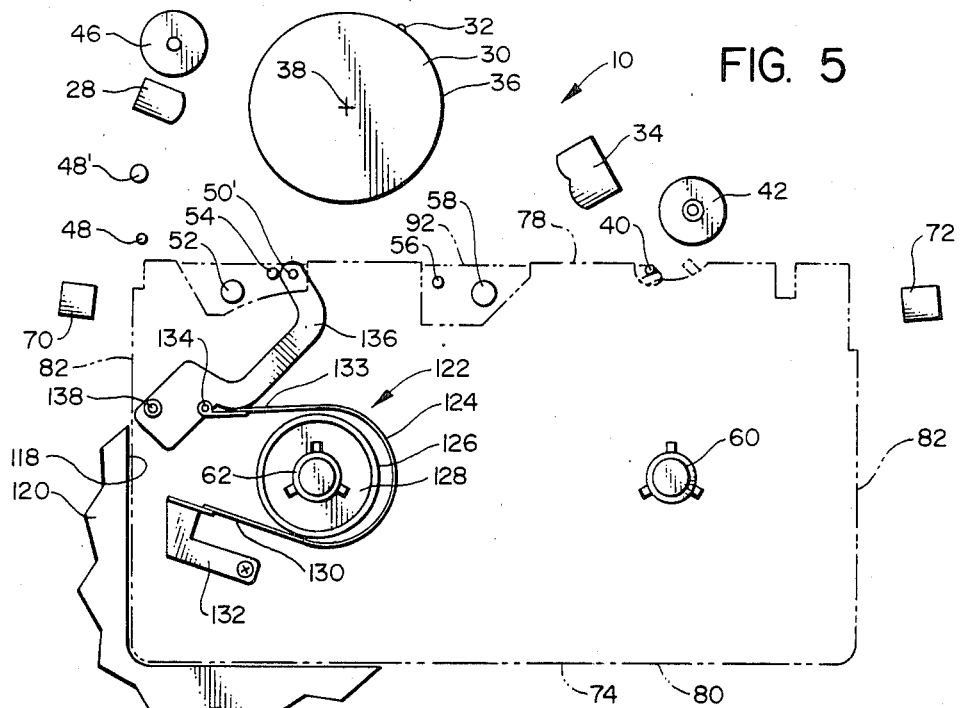
FIG. 5
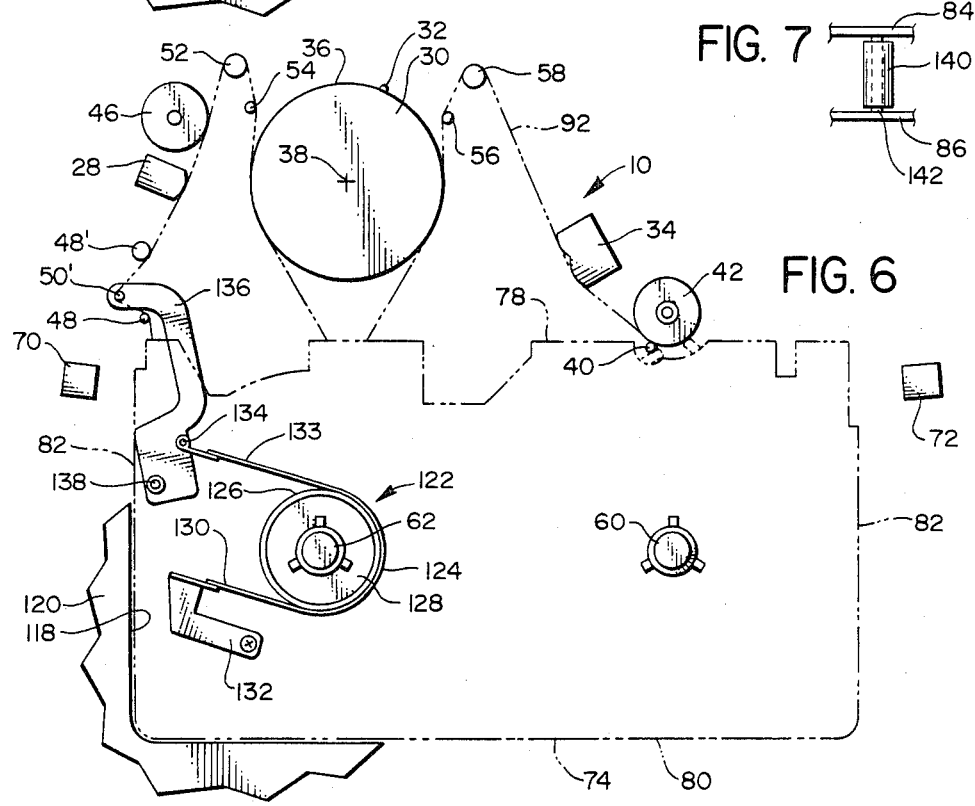
FIG. 6
FIG. 7

METHOD AND APPARATUS FOR CLEANING OPERATING COMPONENTS OF A VIDEO PLAYER/RECORDER

This is a continuation of application Ser. No. 833,875, filed Feb. 25, 1986, now abandoned.

BACKGROUND OF THE INVENTION

1. Technical Field

The present invention relates to a method and apparatus for cleaning operating components of a video player/recorder.

2. Background Art

In recent years, video player/recorders have become quite popular. Typically, there is a video head which either records or plays back the video portion of the playing tape, an audio head which performs the same functions for the sound portion of the tape, an erase head, and possibly other components which engage the tape. In the proper operation of the player/recorder, it is desirable that the surface portion of at least some (and desirably all) of these components which contact the tape be cleaned periodically. There are in the prior art cassette cleaners which have a cassette housing in which is mounted a cleaning ribbon. In operation, the cassette housing is placed into a playing receptacle of the player/recorder, and the start knob or button is moved to the "on" position so that guide members of the player/recorder engage the cleaning ribbon and bring it into engagement with at least the drum of the video head, and in some instances, the other operating components which would normally come into contact with the playing tape.

In some player/recorders, the drum in which the playing head is mounted rotates at a high rate of speed. In other player/recorders, the drum for the playing head remains stationary, while the playing head itself rotates at a high rate of speed along the circumference of the drum. During the normal mode of operation, the magnetic tape which is either being played or on which the recording is being made moves along its length at a controlled rate of speed adjacent the playing head. If the drum of the playing head is stationary, the relative movement between the magnetic tape and the drum is at a substantially lower level. On the other hand, if the drum is rotating at a high rate of speed (e.g. 1000 to 2000 revolutions per minute), the relative speed between the drum and the magnetic tape is rather high.

In general, the cassette cleaners have had the cleaning ribbon mounted in one of two ways. In one arrangement, the cleaning ribbon is moved out of the cassette housing into engagement with the drum of the cleaning head, and the cleaning ribbon does not move along its axial length. Thus, it is the rapid rotation of the drum of the cleaning head which accounts for the relative movement between the cleaning ribbon and the drum. In the second arrangement, the cleaning ribbon is mounted on spools within the cassette housing so that after it is moved out of the cassette housing into cleaning engagement with the drum (and possibly other components of the player/recorder), the cleaning ribbon moves along its axial length at substantially the same rate of speed as the magnetic tape in the normal mode of operation of the player/recorder. In either case, there is relative movement between the cleaning ribbon and the drum of the playing head.

One of the major problems in providing such cassette cleaners is the sensitivity of the operating components of the various player/recorders. For example, the cassettes for magnetic tapes generally have two spools which engage spindles of the player/recorder. During normal operations, the magnetic tape will be unwound from one spool and wound onto the other. If the spindles (or possibly other operating components of the player/recorder) sense a resistance to rotation greater than a certain level, this will generally activate a shutoff mechanism in the player/recorder. The reason for this is that the increased resistance indicates a problem, and the player/recorder shuts off to avoid damage to the magnetic tape or possibly damage to the player/recorder itself.

In addition, a number of player/recorders have other shutoff mechanisms. For example, there are the capstan and pinch roller which grip opposite sides of the tape, with the capstan being rotated under power so as to cause rotation of the pinch roller and move the magnetic tape along its length at a controlled rate. If for some reason the capstan is not causing the corresponding rotation of the pinch roller, so that the tape is not being moved, this might also trigger a shutoff mechanism.

Generally, the magnetic tape is made of a quite thin, rather flexible, low friction material. However, the cleaning ribbon of a cassette cleaner, in order to perform its cleaning function properly, has a somewhat different structure. First, it will generally be made of an absorbant material so that it can absorb a cleaning liquid. Second, since the cleaning is achieved by a wiping action against the drum, and possibly other components of the player/recorder, the friction of the cleaning ribbon moving relative to the drum may be somewhat greater than the friction of the conventional magnetic tape moving through the player/recorder and against the drum. Further, the cleaning ribbon is quite often made somewhat thicker than the conventional magnetic tape, so it would be more absorbant, with the result that if the cleaning ribbon is arranged so that it moves through the player/recorder along generally the same path as the magnetic tape, the greater stiffness of the cleaning ribbon (relative to the magnetic tape) might create greater resistance to the movement of the cleaning ribbon. Overall, these various operating characteristics of the cleaning ribbon sometimes create sufficient resistance to the operating components of the player/recorder so as to trigger an automatic shutoff mechanism of the player/recorder, thus prematurely stopping the cleaning action.

A further complicating factor is that quite commonly the action of the cleaning fluid increases the frictional force resulting from engagement of the wetted ribbon against the drum. Thus, there is a tendency for the cleaning ribbon to create an excessive resisting force to the rotation of the drum, thus prematurely triggering the shutoff mechanism of the player/recorder. There have been various attempts to lower the resistance created by the cleaning ribbon, such as modifying the material used, the thickness of the material, the material's absorbancy, etc. In some instances, such attempts to decrease the frictional resistance or other resistance have the effect of diminishing the cleaning effectiveness of the ribbon.

SUMMARY OF THE INVENTION

It is an object of the present invention to provide a cleaning apparatus and method for a video player/recorder, particularly adapted to alleviate some of the problems noted above, while properly performing a cleaning function.

The cleaning apparatus of the present invention is arranged to clean a playing and/or recording machine, where the machine has:

a. a structure defining a recess to receive a tape cassette, said recess having a forward portion to receive a front portion of said cassette, and a rear portion to receive a rear portion of said cassette;

b. a head carrying member which carries a rotating head element and has a curved peripheral surface;

c. first and second guide means movable between first and second nonoperating positions, respectively, and first and second operating positions, respectively, said first guide means in said first nonoperating position being located at a first retracted guide location, said second guide means in said second nonoperating position being located at a second nonoperating guide location, said first guide means being arranged so that with a tape cassette in the recess, the first guide means in moving from the first nonoperating position to the first operating position engages a first tape portion positioned along a first section of the front portion of the cassette and moves the tape outwardly from the cassette into engagement with a first side portion of the peripheral surface of the head carrying member, said second guide means being arranged so that with the tape cassette in the recess, the second guide means in moving from the second nonoperating position to the second operating position engages a second tape portion positioned along a second section of the front portion of the cassette and moves the tape outwardly from the cassette into engagement with a second side portion of the head carrying member.

The cleaning apparatus comprises a housing having a front portion, a back portion, and first and second side portions. The housing is adapted to be positioned in the recess of the machine.

A cleaning ribbon is mounted in the housing in a manner to have a first retracted position and a second cleaning position. The ribbon has first and second end portions operatively connected to the housing, and a third intermediate portion which, with the ribbon in its first retracted position, and with the housing positioned in the recess, extends along a forward edge portion of the housing. First and second sections of the intermediate ribbon portion are positioned forwardly of the first and second retracted guide locations, respectively, when the housing is positioned in the recess of the machine. There is a locating element mounted to the housing at a stationary location at the front portion of the housing. This location element is positioned between the first and second retracted guide locations, when the housing is positioned in the recess of the machine.

The locating element is positioned forwardly of a third adjacent section of the ribbon which extends between the first and second sections. The locating element is positioned, with the housing located in the recess, relative to the first and second guide means and relative to the peripheral surface of the head carrying member, in a manner that when said first and second guide means engage said first and second sections of the intermediate ribbon portion and move outwardly to their first and second operating positions, the locating element restrains outward movement of the third section of the intermediate ribbon portion so as to maintain said third ribbon section out of engagement with the peripheral surface of the head carrying member. This is accomplished in a manner that the peripheral surface of the head carrying member is engaged by the cleaning ribbon along an arcuate length of the peripheral surface which is less than an arcuate length of engagement of the tape when the tape in said tape cassette is in said operating position extending in a curved path around the peripheral surface of the head carrying member.

In the preferred embodiment, there are first and second spool means rotatably mounted to the housing at first and second spool locations to engage first and second sprockets, respectively, of the machine. The first and second end portions of the ribbon are connected to the first and second spool means, respectively.

In the preferred configuration, the locating element comprises a roller rotatably mounted in the housing so as to engage the cleaning ribbon with a relatively low frictional engagement.

Also in the preferred form, the cleaning ribbon is a wettable ribbon adapted to receive a cleaning solution on the ribbon, in a manner that when the ribbon comes into engagement with the peripheral surface of the head carrying member, the cleaning solution is able to be applied to the head carrying member.

In the specific embodiment shown herein, the cleaning apparatus is provided with means to enable the cleaning ribbon to be wetted at spaced locations along its length. Thus, the ribbon has alternate wetted and dry locations along the length of the cleaning ribbon. Specifically, the housing is provided with opening means enclosing spaced segments of the ribbon. This permits application of a cleaning solution at said spaced locations by applying the cleaning solution through the opening means.

In the preferred form, the cleaning ribbon has first and second contact portions which engage first and second surface portions of the peripheral surface of the head carrying member. There is a third surface portion of the peripheral surface of the head carrying member which is out of contact with the ribbon, this third surface portion being located between the first and second surface portions and facing the third ribbon section. Desirably, this third portion of the peripheral surface of the head carrying member is at least about $\frac{1}{4}$th of a circle in arcuate length around the head carrying member.

Further, each of the first and second contact portions of the cleaning ribbon engage first and second surface portions of the peripheral surface of the head carrying member along an arcuate length of the peripheral surface no greater than approximately $\frac{1}{8}$th of a circle.

In the method of the present invention, a cleaning apparatus is provided as described above. The cleaning apparatus is placed in the recess of the machine, and the first and second guide means are caused to move outwardly to bring the cleaning ribbon into cleaning engagement with the peripheral surface of the head carrying member. The locating element is utilized to restrain outward movement of the cleaning ribbon in the manner described above.

Other features of the present invention will become apparent from the following detailed description.

BRIEF DESCRIPTION OF THE DRAWING

FIG. 5 is a top plan view similar to FIG. 3, but showing the cassette cleaner of the present invention in broken lines, and illustrating in full lines the ribbon tensioning device present in the existing player/recorder, and with the cleaning ribbon in its retracted position;

FIG. 6 is a view similar to FIG. 5, illustrating the ribbon positioned outwardly in its cleaning position, and with the tensioning device of the player/recorder operating to control tension on the ribbon; and FIG. 7 is a front elevational view taken at line 7—7 of FIG. 3 and illustrating a retaining element or roller of the cassette cleaner of the present invention.

DESCRIPTION OF THE PREFERRED EMBODIMENT

The present invention is particularly adapted to clean the operating components of a video playing/recording unit which is adapted to accept cassette-type playing tapes, where the tape is extracted by guide members to be positioned in its playing/recording location in a manner that the tape extends in approximately a 180° arc around the periphery of the drum. Further, the tape is positioned so that one set of movable guide members pulls the tape outwardly from the cassette housing to be positioned along one side of the drum, while a second set of guide members pulls the tape outwardly so as to be positioned on an opposite side of the drum, with the tape extending along the 180° arc between the two sides. Accordingly, it is believed that a clearer understanding of the present invention will be obtained by first describing the operating components of such a conventional video playing/recording unit, and then describing the present invention. In the following description, the video playing/recording unit 10 will be referred to as "the video unit" or simply as "unit".

Figure 1:
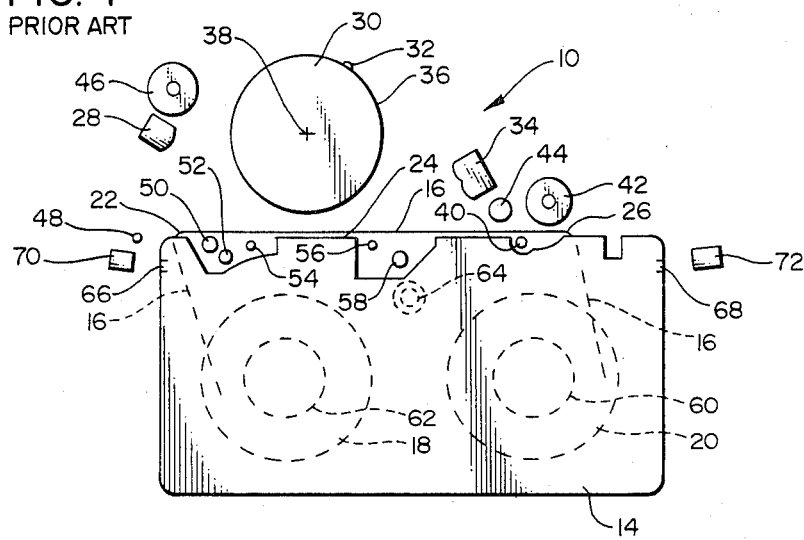
FIG. 1 is a plan view of a typical video tape cassette and the operating components of one type of a video player/recorder for which the present invention is adapted to be used, with the tape being in its retracted position in the cassette.
Figure 2:
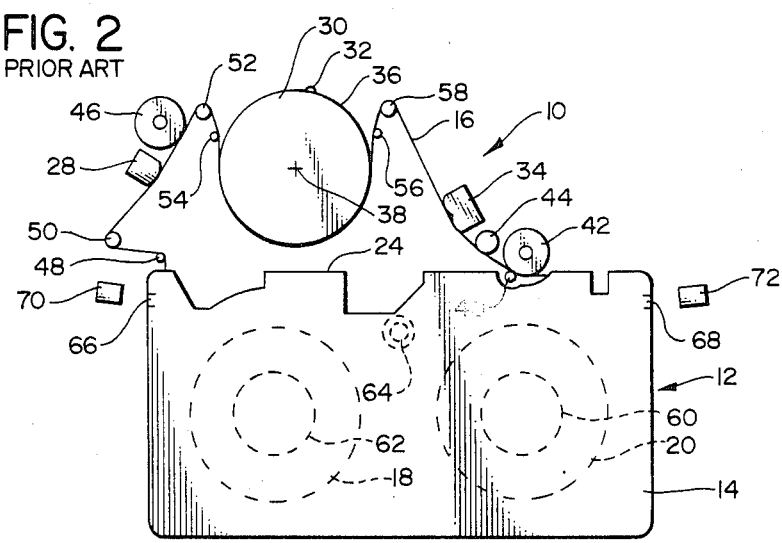
FIG. 2 is a view similar to FIG. 1, illustrating the tape being extracted from the cassette and in its operating position.

In FIGS. 1 and 2, some of the main operating components of the video unit 10 are shown in plan view, with a conventional tape cassette also being shown in plan view in its operating position in the video unit. In the illustrations of FIGS. 1 and 2, the housing, circuit components, operating knobs and certain other components of the video unit 10 are not shown, since these are not required for an understanding of the present invention.

The tape cassette 12 comprises a case or housing 14 and a magnetic tape 16. The tape 16 is wound on right and left spools 18 and 20, the tape extending from one spool 18 to a location 22 at the front left corner of the case 14, thence along the front edge 24 of the case 14 to the right front location 26, and thence back to the right spool 20. In FIG. 1, the tape 16 is shown in its nonplaying or retracted position, and in FIG. 2 in its operating position.

To describe the operating components of the video unit 10, there are three magnetic operating components which either respond to the magnetic signals on the tape 16, affect the magnetic signals on the tape 16, or do both. These magnetic operating components are: an erase head 28, a drum 30 with a playing head or element 32, and an audio head 34. The drum 30 has the general configuration of a circular disc (i.e. a shallow cylinder), and has a peripheral cylindrically-shaped operating surface 36. The playing head or element 32 is mounted at the peripheral surface 36 and in this particular player/recorder, the drum 30 itself rotates about the center axis 38.

The unit 10 also comprises a number of mechanical components which operate directly on the tape 16 to properly position the tape 16 in the operating mode, and also to move the tape 16 along its operating path. First, there is a capstan 40 and a pinch roller 42. Further, there are guide rollers 44 and 46. Finally, there are six moveable guide members designated 48–58, respectively. In operation, the guide members 50–58 engage the back side of the tape 16 and move it outwardly into the playing position shown in FIG. 2. In this particular unit 10, three of the guide rollers (50–54) carry the tape 16 outwardly along one side of the drum 30, while two other guide rollers 56 and 58 carry the tape 16 to the opposite side of the drum 30, with the guide roller 48 performing a locating function.

There is a first drive sprocket 60 which fits into the center portion of the right spool 20 in a spline fit so that it is able to drive the spool 20. There is a second take-up sprocket 62 which fits through the center of the left spool 18 in a spline fit. When the tape cassette 12 is initially placed in the unit 10, the unit 10 is in its nonoperating position, and the operating components are in the position shown in FIG. 1. When the unit 10 is placed in its operating mode, the guide members 48–58 move outwardly to the position of FIG. 2, and the pinch roller 42 moves rearwardly to press the right hand portion of the tape 16 against the capstan 40. Also, the drive sprocket 60 rotates the sprocket 20 clockwise to cause the tape 16 to be wound thereon.

There is a shutoff light 64 which fits in a matching recess formed in the forward middle portion of the bottom of the case 14. At the forward portions of the left and right edges of the case 14, there are two openings 66 and 68, respectively. The unit 10 has a left photocell 70 positioned adjacent the left side of the case 14 and in alignment with the light 64 and the left opening 66. In some instances, there may be a right photocell 72 positioned adjacent the right side of the case 14 and in alignment with the light 64 and the right opening 68. During normal operation, the photocell 70 (and the photocell 72 if it exists) is shielded by the tape. However, when the tape 16 travels to its end position, there is a clear leader portion which permits the light 58 to activate the photocell 70 (or the photocell 72) to activate the shutoff mechanism in the unit 10.

It is to be understood that the video player 10, the tape cassette 12 and the above-described mode of operation of these, already exist in the prior art.

Figure 3:
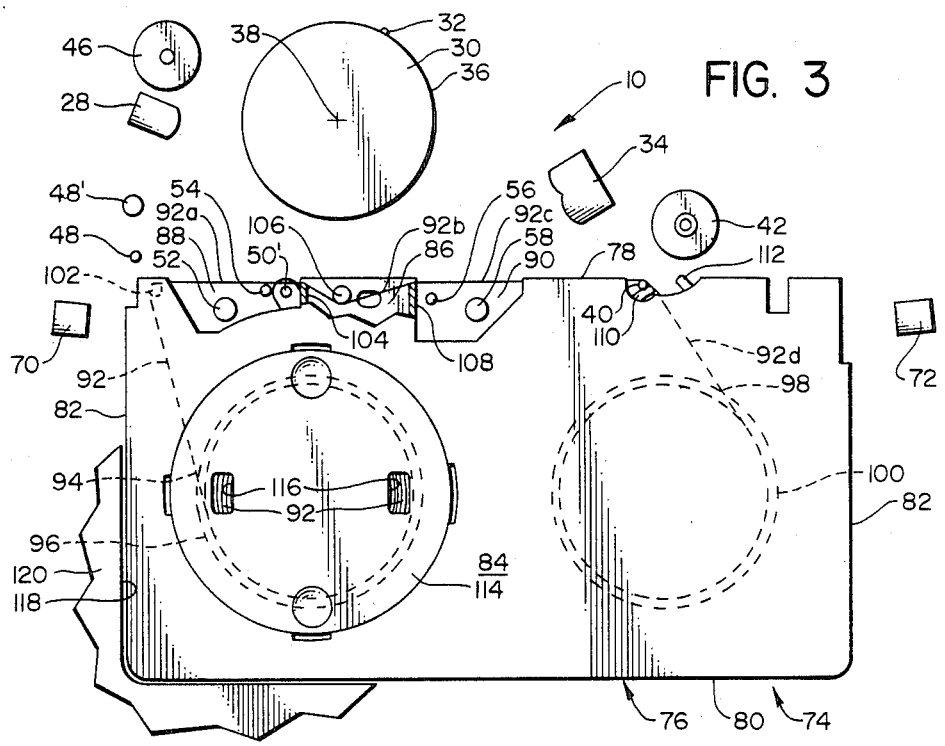
FIG. 3 is a top plan view of a cassette cleaner of the present invention, shown in its operating position in a cassette receiving recess of a video player/recorder, and with a portion of the top cover removed for purposes of illustration, and with the cleaning ribbon in its retracted position.
Figure 4:
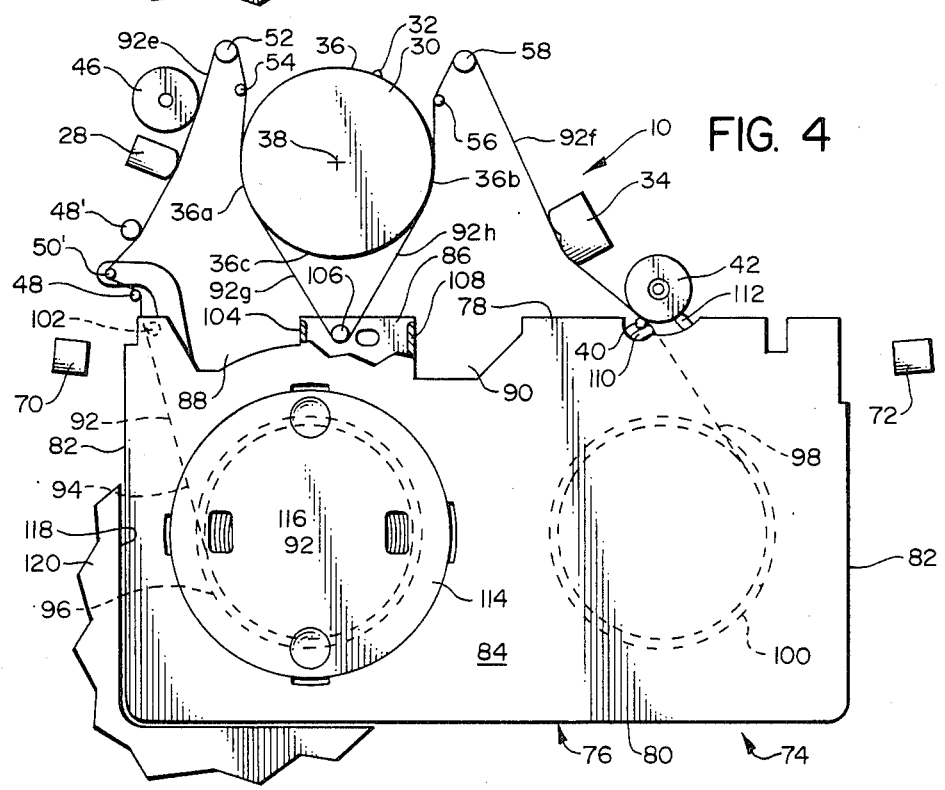
FIG. 4 is a view similar to FIG. 3, showing the cleaning ribbon extracted from the cassette cleaner and in its operating or cleaning position.

To describe the present invention, reference is presently made to FIGS. 3 and 4, where a cassette cleaner 74 of the present invention is shown in its operating position in the video unit 10. As a matter of minor clarification, the prior art video unit 10 which is shown in FIGS. 3-6 is of the same basic type as that shown in FIGS. 1 and 2 and already exists in the prior art, but has some minor differences. The somewhat modified prior art version of the video unit 10 is shown in FIGS. 3-6 primarily for convenience of illustration and also for convenience in explaining certain operating characteristics of such a prior art video unit, and more specifically, the tape tensioning means of the video unit 10. The specific structural differences in the unit 10 shown in FIGS. 3-6 will be explained later herein. However, it's to be understood that the cassette cleaner 74 of the present invention could be used with either of the video units (i.e. the one shown in FIGS. 1 and 2, or the one in FIGS. 3-6).

The cassette cleaner 74 of the present invention comprises a case or housing 76 which is or may be substantially similar to the housing 14 of the conventional tape cassette 12. As shown herein, this housing 76 comprises a front wall portion 78, a rear wall 80, two side walls 82, a top wall 84 and a bottom wall 86 (a small portion of which is shown in FIG. 3). Further, the front edge portion of the housing 76 is formed with two recesses, namely a left recess 88 provided to accommodate the guide members 50', 52 and 54, and a central forward recess 90, located to accommodate the two movable guide members 56 and 58.

A cleaning ribbon 92 is mounted in the housing 76 in a manner that a first left end portion 94 is connected to a left spool 96 and a second right end portion 98 is connected to a right spool 100. The two spools 96 and 100 are mounted in the housing 76 in generally the same manner and in generally the same location as the spools 60 and 62 in the conventional tape cassette 12, so that these spools 96 and 100 engage the drive spindles 62 and 60 of the player/recorder unit 10.

As shown in FIG. 3, the left end portion 94 of the ribbon 92 extends forwardly to engage and extend around a locating pin 102 positioned in the left forward corner of the housing 76. From the pin 102, the ribbon 92 extends at 92a across the forward part of the aforementioned left forward recess 88. The ribbon 92 then extends from the ribbon portion 92a to engage the front edge of a left locating wall or abutment 104 and then moderately rearwardly and to the right to reach behind a locating element or roller 106 and then extend further to the right and moderately forwardly to engage a forward edge of a second right abutment or locating wall 108. This locating roller 106 is particularly critical in the operation of the present invention, and its function will be discussed more fully later herein in the description of the operation of the present invention. That portion of the ribbon 92 extending between the two abutments or walls 104 and 108 and behind the locating roller 106 is designated 92b.

The ribbon 92 extends from the ribbon portion 92b further to the right, as at 92c, to be positioned at the forward portion of the aforementioned recess 90 and then extends further to the right to a forward end location adjacent to the capstan 40. The locating of the right forward portion of the ribbon 92 can be accomplished in a number of ways. In the particular embodiment shown herein, there is provided a pair of cleaning pads, namely a first pad 110 positioned to engage and clean the capstan 40, and a second pad 112 positioned to engage and clean the pinch roller 42. The cleaning ribbon portion 92c extends from the right locating wall 108 to engage the forward end of the capstan pad 110, and to extend therefrom at 92d to engage the spool 100. These cleaning pads 110 and 112 can be mounted and positioned in accordance with teachings presently existing in the prior art.

The top wall 84 of the housing 76 is provided with a removable circular cover 114 that fits over the left spool 96. This cover 114 is provided with a pair of diametrically opposed openings 116 which are positioned to expose portions of the cleaning ribbon 92. By applying a cleaning fluid through these openings 116 and onto the ribbon 92, the ribbon 92 becomes wetted with the solution at spaced locations along the length thereof.

To describe the operation of the present invention, the cleaning ribbon 92 is positioned so that the ribbon 92 is wound a number of times around the left spool 96 so that several overlapping portions of the ribbon 92 appear at the openings 116 which are formed in the top cover 114. Further, the ribbon 92 is positioned so that the forward ribbon portions 92a–c fit closely against the front edge portion of the housing 76. Then a cleaning solution is applied through the openings 116 to wet portions of the ribbon 92, this resulting in a wetted pattern of alternate wet and dry portions of the ribbon 92.

Then the cassette cleaner 74 is inserted into the recess or cavity 118 that already exists in the player/recorder 10, and which is arranged to receive the conventional tape cassette 12. This recess 118 is indicated somewhat schematically in FIGS. 3 and 4 by showing at 120 a portion of the video unit structure which defines the cassette receiving recess 118. With the cassette cleaner 74 so positioned, as shown in FIG. 3, the three left guide members 50', 52 and 54 are positioned in the forward cassette housing recess 88, while the two movable guide members 56 and 58 are located in the cassette housing recess 90. Further, the cleaning ribbon portion 92a is positioned just forwardly of the guide members 50', 52 and 54, while the cleaning ribbon portion 92c is positioned just forwardly of the two movable guide members 56 and 58.

With the cassette cleaner 74 positioned as shown in FIG. 3, the operating knob or button of the video unit 10 is moved to the play or record position to cause the guide members 50' and 52-58 to move outwardly from the two recessed areas 88 and 90 to the positions shown in FIG. 4. The guide members 50', 52 and 54 carry a left forward portion 92e of the ribbon 92 outwardly so that it comes into engagement with the erase head 28, the stationary guide roller 46 and with a left circumferential portion 36a of the surface 36 of the drum 30. The two right guides 56 and 58 carry the ribbon 92 forwardly so that there is a ribbon portion 92f which comes into cleaning engagement with the audio head 34 and with a right peripheral portion 36b of the cylindrical surface 36 of the drum 30.

It will be noted that the locating roller 106 engages and restrains the cleaning ribbon portion 92b so that one ribbon portion 92g extends from the drum surface portion 36a rearwardly with a moderate slant to the right toward the locating roller 106, and so that a second ribbon portion 92h extends from the drum surface portion 36b rearwardly with a moderate slant to the left toward the locating roller 106.

The locating roller 106 is so positioned, relative to the location of the guide member 54 and the drum surface 36, that the length of the drum surface segment 36a that is engaged by a related contact portion of the cleaning ribbon 92 is approximately 45° in arcuate length (i.e.

about ⅛th of a circle). In like manner, the locating roller 106 is positioned relative to the drum surface 36 and the locating element 56 that the drum surface portion 36b that is engaged by a related contact portion of the ribbon 92 has an arcuate length of approximately 30°. Thus, there is a substantial arcuate length 36c of the drum surface 36 which is intermediate to the two portions 36a and 36b and which is out of contact with the ribbon 92.

Also, the capstan 42 moves to press the ribbon 92 against the capstan 40, so that rotation of the capstan 40 causes the ribbon 92 to move along its length, with the ribbon 92 being unwound from the left spool 96 and wound onto the right spool 100. After the cleaning cycle is accomplished, the guide members 50′ and 52–58 are moved back to their retracted positions (e.g. by turning the control knob of the unit 10 to its "off" position), as shown in FIG. 3, and the drive spindles 62 and 60 operate to cause the ribbon 92 to be wound onto one or the other of the spools 96 and 100. (The precise manner in which this occurs may vary, depending upon the particular type of unit 10 being used.)

To comment on the beneficial results achieved by the present invention, it will be recalled that earlier in this description it was stated that the locating roller 106 is significant in the operation of the present invention. To comment on this further, it has been found that the utilization of the locating roller 106, in combination with the other components of the cassette cleaner 74 and with the operating components of the unit 10, provides engagement of the cleaning ribbon 92 with the components in a manner to properly achieve the cleaning action, while alleviating to a significant extent the problems related to the frictional engagement of the ribbon 92 with the various components (e.g. problems of premature shut off of the unit 10 or possibly inadequate engagement for proper cleaning of the components). To explain this more fully, reference is now made to FIGS. 5 and 6, where the present invention is shown somewhat schematically in broken lines, and a cover member or plate member of the unit 10 at the location of the recess 118 is removed to display the tape tensioning mechanism 122 of the unit 10. It is to be emphasized that this tape tensioning mechanism 122 is or may be conventional, and the mechanism 122 is simply one type of such mechanism which is known in the prior art.

In this particular arrangement, the tensioning mechanism 122 comprises a friction band or brake band 124 which curves in an arc of about 180° and is positioned to engage a cylindrical surface 126 of a disc 128 which is fixedly connected to the left spindle 62 at a location below the spindle 62. One end 130 of this band 124 is connected to stationary structure at 132 in the housing of the unit 10. A second end 133 of the band 124 is connected at 134 to an arm 136 that is pivotally connected at 138 to fixed structure in the video unit 10. An outer swing end of the arm 136 carries the aforementioned guide member 50′.

In this particular arrangement of the tensioning mechanism 122, the guide member 50′ is positioned somewhat differently from the guide member 50 shown in FIGS. 1 and 2. The reason for this is believed to be due simply to differences in the specific construction of the video unit 10 which is shown in FIGS. 1 and 2, and the unit 10 which is shown in FIGS. 3–6.

To describe briefly the operation of the tensioning mechanism 122, it will be noted that in the position of FIG. 6, the guide member 50′ is moved by an actuating mechanism (not shown for ease of illustration) to push the ribbon 92 to the left beyond a line drawn between the two stationary guide rollers 48′ and 48″. In the position of FIG. 6, the arm 136 causes the brake band 124 to come into frictional engagement with the disc surface 126 to retard rotation of the disc 128, and thus retard rotation of the spindle 62 attached thereto. As the capstan 40 and pinch roller 42 continue to move the ribbon so that the ribbon 92 moves in a direction to be wound onto the right spool 100, under circumstances where the brake band 124 is retarding rotation of the spindle 62, tension on the ribbon 92 will tend to increase, thus causing the ribbon portion 92 that is between the guide rollers 48′ and 48″ to push the guide member 50′ to the right, and thus cause the lever arm 136 to decrease the pressure of the band 124 against the disc surface 126. This in turn reduces tension on the ribbon 92. The overall effect of this is that the ribbon 92 is kept at a substantially constant tension along its length.

To appreciate the benefits achieved by the present invention, it is to be recalled that this same tensioning mechanism 122 acts in substantially the same manner on a conventional magnetic tape 16 of a conventional tape cassette 12. Thus, in a conventional video unit 10, the tape tensioning mechanism 122 will be optimized to produce just the right amount of tension on the magnetic tape 16 so that proper operation can be achieved. However, as indicated previously under "Background of the Invention", to optimize the cleaning effect of the ribbon 92, it may be desirable to form the ribbon 92 of a material which for a given ribbon tension has greater frictional resistance against the various surfaces with which it comes into contact. Further, the wetting of the ribbon 92 increases the frictional resistance to a yet greater extent.

Thus, to alleviate this problem, the locating roller 106 causes the cleaning ribbon 92 to engage two relatively smaller arcuate outer surface segments of the drum surface 36, in comparison with the arcuate length of the drum surface 36 engaged by the magnetic tape 16, operating in the conventional manner, as illustrated in FIGS. 1 and 2. The result is that the total frictional force exerted by the ribbon 92 against the surface 36 of the drum 30 is substantially less than it would be if the cleaning ribbon 92 were engaging a full 180° of the cylindrical surface 36 of the drum 30. Thus, for a given tension on the cleaning ribbon 92 at the location of the tensioning guide member 50′, the overall resistance created by the ribbon 92 can be kept within appropriate limits so as not to prematurely trigger any shutoff mechanisms in the video unit 10.

With regard to the structuring of the locating roller 106, as shown in FIG. 7, in the preferred form this roller 106 has the configuration of a vertical cylinder 140, extending between the bottom wall 86 and top wall 84, and rotatably mounted to a pin 142 connected between the walls 84 and 86. The roller 140 is at a fixed location relative to the case or housing 76, and its position is selected so that the frictional engagement of the ribbon 92 with the drum 30 and with the other components is optimized to allow proper cleaning action and not create excess frictional force.

It is to be recognized that various modifications could be made to the cleaning cassette 74 of the present invention, and to the method of using the same, without departing from the basic teachings thereof. Further, the preceding description is not intended to be limiting, and is given by way of describing the presently preferred embodiment of the present invention.

I claim:

1. A cleaning apparatus for a playing and/or recording machine, where said machine has:
   a. a structure defining a recess to receive a tape cassette, said recess having a forward portion to receive a front portion of said cassette, and a rear portion to receive a rear portion of said cassette;
   b. a head carrying member which carries a rotating head element and has a curved peripheral surface;
   c. first and second guide means movable between first and second nonoperating positions, respectively, and first and second operating positions, respectively, said first guide means in said first nonoperating position being located at a first retracted guide location, said second guide means in said second nonoperating position being located at a second retracted guide location, said first guide means being arranged so that with a tape cassette in the recess, the first guide means in moving from the first nonoperating position to the first operating position engages a first tape portion positioned along a first section of the front portion of the cassette and moves the tape outwardly form the cassette into engagement with a first side portion of the peripheral surface of the head carrying member, said second guide means being arranged so that with the tape cassette in the recess, the second guide means in moving from the second nonoperating position to the second operating position engages a second tape portion positioned along a second section of the front portion of the cassette and moves the tape outwardly from the cassette into engagement with a second side portion of the head carrying member;

said cleaning apparatus comprising:
   a. a housing having a front portion, a rear portion, and first and second side portions, said housing being adapted to be positioned in the recess of the machine;
   b. a cleaning ribbon mounted in said housing in a manner to have a first retracted position and a second cleaning position, said ribbon having first and second end portions operatively connected to said housing, and a third intermediate portion which, with the ribbon in its first retracted position, and with the housing positioned in said recess, extends along a forward edge portion of the housing, with first and second sections of the intermediate ribbon portion being positioned forwardly of said first and second retracted guide locations, respectively, when the housing is positioned in the recess of the machine;
   c. a locating element mounted to said housing at a stationary location at the front portion of the housing, said locating element being positioned between said first and second retracted guide locations, when the housing is positioned in the recess of the machine;
   d. said locating element being positioned forwardly of a third adjacent section of said ribbon which extends between said first and second sections, said locating element being positioned, with said housing located in the recess, relative to the first and second guide means and relative to the peripheral surface of the head carrying member, in a manner that when said first and second guide means engage said first and second sections of the intermediate ribbon portion and move outwardly to their first and second operating positions, said locating element restrains outward movement of said third section of the intermediate ribbon portion so as to maintain said third ribbon section out of engagement with the peripheral surface of the head carrying member, and in a manner that the peripheral surface of the head carrying member is engaged by said cleaning ribbon along an arcuate length of the peripheral surface which is less than an arcuate length of engagement of the tape when the tape in said tape cassette is in said operating position extending in a curved path around the peripheral surface of the head carrying member;
   e. first and second spool means rotatably mounted to said housing at first and second spool locations to engage first and second sprockets, respectively, of the machine, the first and second end portions of the ribbon being connected to said first and second spool means, respectively;
   f. said locating element comprising a roller rotatably mounted in said housing so as to engage said cleaning ribbon with a relatively low frictional engagement.

2. A method of cleaning a playing and/or recording machine, where said machine has:
   a. a structure defining a recess to receive a tape cassette, said recess having a forward portion to receive a front portion of said cassette, and a rear portion to receive a rear portion of said cassette;
   b. a head carrying member which carries a rotating head element and has a curved peripheral surface;
   c. first and second guide means movable between first and second nonoperating positions, respectively, and first and second operating positions, respectively, said first guide means in said first nonoperating position being located at a first retracted guide location, said second guide means in said second nonoperating position being located at a second retracted guide location, said first guide means being arranged so that with a tape cassette in the recess, the first guide means in moving from the first nonoperating position to the first operating position engages a first tape portion positioned along a first section of the front portion of the cassette and moves the tape outwardly from the cassette into engagement with a first side portion of the peripheral surface of the head carrying member, said second guide means being arranged so that with the tape cassette in the recess, the second guide means in moving from the second nonoperating position to the second operating position engages a second tape portion positioned along a second section of the front portion of the cassette and moves the tape outwardly from the cassette into engagement with a second side portion of the head carrying member;

said method comprising:
   a. providing a cleaning apparatus comprising:
      1. a housing having a front portion, a rear portion, and first and second side portions, said housing being adapted to be positioned in the recess of the machine;
      2. a cleaning ribbon mounted in said housing in a manner to have a first retracted position and a second cleaning position, said ribbon having first and second end portions operatively connected to said housing, and a third intermediate portion which, with the ribbon in its first retracted position, and with the housing positioned in said recess, extends along a forward edge portion of the housing, with first and second sections of the intermediate ribbon portion being positioned forwardly of said first and second retracted guide locations, respectively, when the housing is positioned in the recess of the machine;

b. said method further comprising:
1. positioning a locating element in said housing at a stationary location at the front portion of the housing, said locating element being positioned between said first and second retracted guide locations, when the housing is positioned in the recess of the machine, with said locating element being positioned forwardly of a third adjacent section of said ribbon which extends between said first and second sections;
2. inserting said housing in the recess;
3. engaging said first and second sections of the intermediate ribbon portion with said first and second guide means and moving the first and second guide means outwardly to their first and second operating positions,
4. restraining outward movement of said third section of the intermediate ribbon portion by means of said locating element so as to maintain said third ribbon section out of engagement with the peripheral surface of the head carrying member, and in a manner that the peripheral surface of the head carrying member is engaged by said cleaning ribbon along an arcuate length of the peripheral surface which is less than an arcuate length of engagement of the tape when the tape in said tape cassette is in said operating position extending in a curved path around the peripheral surface of the head carrying member, c. said method being further characterized in that there are first and second spool means rotatably mounted to said housing at first and second spool locations to engage first and second sprockets, respectively, of the machine, said method further comprising connecting the first and second end portions of the ribbon to said first and second spool means, respectively, and said locating element comprises a roller rotatably mounted in said housing so as to engage said cleaning ribbon with a relatively low frictional engagement.

3. A cleaning apparatus for a playing and/or recording machine, where said machine has:
a. a structure defining a recess to receive a tape cassette, said recess having a forward portion to receive a front portion of said cassette, and a rear portion to receive a rear portion of said cassette;
b. a head carrying member which carries a rotating head element and has a curved peripheral surface;
c. first and second guide means movable between first and second nonoperating positions, respectively, and first and second operating positions, respectively, said first guide means in said first nonoperating position being located at a first retracted guide location, said second guide means in said second nonoperating position being located at a second retracted guide location, said first guide means being arranged so that with a tape cassette in the recess, the first guide means in moving from the first nonoperating position to the first operating position engages a first tape portion positioned along a first section of the front portion of the cassette and moves the tape outwardly from the cassette into engagement with a first side portion of the peripheral surface of the head carrying member, said second guide means being arranged so that with the tape cassette in the recess, the second guide means in moving from the second nonoperating position to the second operating position engages a second tape portion positioned along a second section of the front portion of the cassette and moves the tape outwardly from the cassette into engagement with a second side portion of the head carrying member;

said cleaning apparatus comprising:
a. a housing having a front portion, a rear portion, and first and second side portions, said housing being adapted to be positioned in the recess of the machine;
b. a cleaning ribbon mounted in said housing in a manner to have a first retracted position and a second cleaning position, said ribbon having first and second end portions operatively connected to said housing, and a third intermediate portion which, with the ribbon in its first retracted position, and with the housing positioned in said recess, extends along a forward edge portion of the housing, with first and second sections of the intermediate ribbon portion being positioned forwardly of said first and second retracted guide locations, respectively, when the housing is positioned in the recess of the machine;
c. a locating element mounted to said housing at a stationary location at the front portion of the housing, said locating element being positioned between said first and second retracted guide locations, when the housing is positioned in the recess of the machine;
d. said locating element being positioned forwardly of a third adjacent section of said ribbon which extends between said first and second sections, said locating element being positioned, with said housing located in the recess, relative to the first and second guide means and relative to the peripheral surface of the head carrying member, in a manner that when said first and second guide means engage said first and second sections of the intermediate ribbon portion and move outwardly to their first and second operating positions, said locating element restrains outward movement of said third section of the intermediate ribbon portion so as to maintain said third ribbon section out of engagement with the peripheral surface of the head carrying member, and in a manner that the peripheral surface of the head carrying member is engaged by said cleaning ribbon along an arcuate length of the peripheral surface which is less than an arcuate length of engagement of the tape when the tape in said tape cassette is in said operating position extending in a curved path around the peripheral surface of the head carrying member;
e. said locating element comprising a roller rotatably mounted in said housing so as to engage said cleaning ribbon with a relatively low frictional engagement.

4. A method of cleaning a playing and/or recording machine, where said machine has:

a. a structure defining a recess to receive a tape cassette, said recess having a forward portion to receive a front portion of said cassette, and a rear portion to receive a rear portion of said cassette;
b. a head carrying member which carries a rotating head element and has a curved peripheral surface;
c. first and second guide means movable between first and second nonoperating positions, respectively, and first and second operating positions, respectively, said first guide means in said first nonoperating position being located at a first retracted guide location, said second guide means in said second nonoperating position being located at a second retracted guide location, said first guide means being arranged so that with a tape cassette in the recess, the first guide means in moving from the first nonoperating position to the first operating position engages a first tape portion positioned along a first section of the front portion of the cassette and moves the tape outwardly from the cassette into engagement with a first side portion of the peripheral surface of the head carrying member, said second guide means being arranged so that with the tape cassette in the recess, the second guide means in moving from the second nonoperating position to the second operating position engages a second tape portion positioned along a second section of the front portion of the cassette and moves the tape outwardly from the cassette into engagement with a second side portion of the head carrying member;

said method comprising:
a. providing a cleaning apparatus comprising:
1. a housing having a front portion, a rear portion, and first and second side portions, said housing being adapted to be positioned in the recess of the machine;
2. a cleaning ribbon mounted in said housing in a manner to have a first retracted position and a second cleaning position, said ribbon having first and second end portions operatively connected to said housing, and a third intermediate portion which, with the ribbon in its first retracted position, and with the housing positioned in said recess, extends along a forward edge portion of the housing, with first and second sections of the intermediate ribbon portion being positioned forwardly of said first and second retracted guide locations, respectively, when the housing is positioned in the recess of the machine;
b. said method further comprising:
1. positioning a locating element in said housing at a stationary location at the front portion of the housing, said locating element being positioned between said first and second retracted guide locations, when the housing is positioned in the recess of the machine, with said locating element being positioned forwardly of a third adjacent section of said ribbon which extends between said first and second sections;
2. inserting said housing in the recess;
3. engaging said first and second sections of the intermediate ribbon portion with said first and second guide means and moving the first and second guide means outwardly to their first and second operating positions,
4. restraining outward movement of said third section of the intermediate ribbon portion by means of said locating element so as to maintain said third ribbon section out of engagement with the peripheral surface of the head carrying member, and in a manner that the peripheral surface of the head carrying member is engaged by said cleaning ribbon along an arcuate length of the peripheral surface which is less than an arcuate length of engagement of the tape when the tape in said tape cassette is in said operating position extending in a curved path around the peripheral surface of the head carrying member.
c. said method being further characterized in that said locating element comprises a roller rotatably mounted in said housing so as to engage said cleaning ribbon with a relatively low frictional engagement.

* * * * *